(12) United States Patent
Nakamura

(10) Patent No.: US 9,279,703 B2
(45) Date of Patent: Mar. 8, 2016

(54) ENCODER AND APPARATUS WITH THE SAME

(71) Applicant: CANON KABUSHIKI KAISHA, Tokyo (JP)

(72) Inventor: Hitoshi Nakamura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 611 days.

(21) Appl. No.: 13/651,724

(22) Filed: Oct. 15, 2012

(65) Prior Publication Data

US 2013/0096862 A1 Apr. 18, 2013

(30) Foreign Application Priority Data

Oct. 14, 2011 (JP) ................................ 2011-226417

(51) Int. Cl.
*G01D 5/347* (2006.01)

(52) U.S. Cl.
CPC ..................... *G01D 5/347* (2013.01)

(58) Field of Classification Search
CPC ............ G01D 5/24409; G01D 5/2448; G01D 5/24476; H03M 1/06; H03M 1/303; H03M 1/12; H02P 6/006
USPC ............. 250/231.16, 231.18; 318/490; 327/3, 327/156; 341/111, 118, 155; 702/94, 104, 702/106, 150, 85
See application file for complete search history.

(56) References Cited

U.S. PATENT DOCUMENTS

| | | | |
|---|---|---|---|
| 2005/0090998 A1* | 4/2005 | Atsuta et al. | 702/117 |
| 2005/0274878 A1* | 12/2005 | Goldman et al. | 250/231.13 |
| 2005/0280563 A1* | 12/2005 | Teraguchi | 341/50 |
| 2005/0285026 A1* | 12/2005 | Kawai et al. | 250/231.13 |

(Continued)

FOREIGN PATENT DOCUMENTS

| | | |
|---|---|---|
| DE | 10 2008 043556 A1 | 5/2010 |
| EP | 2 144 042 A2 | 1/2010 |

(Continued)

OTHER PUBLICATIONS

European Search Report & Opinion issued in Counterpart 12187896.1 dated Dec. 12, 2013.
Japanese Office Action issued in Japanese counterpart application No. JP2011-226417, dated Sep. 24, 2015.

*Primary Examiner* — Toan Le
*Assistant Examiner* — Jeffrey Aiello
(74) *Attorney, Agent, or Firm* — Rossi, Kimms & McDowell LLP

(57) ABSTRACT

The encoder includes a scale provided with a periodic pattern, a sensor relatively movable with respect to the scale and reading the periodic pattern to output analog signals each having a changing period corresponding to the periodic pattern and having mutually different phases, an A/D converter performing time-division analog-to-digital conversion on the analog signals output from the sensor to produce digital signals, and a phase detector detecting a phase from the digital signals. The encoder further includes a corrector calculating a correction value by using a relative movement speed of the scale and the sensor and the detected phase detected by the phase detector, and calculating a corrected phase from the correction value and the detected phase, and a position detector calculating a position in a direction in which the scale and the sensor are relativity moved by using the corrected phase.

7 Claims, 3 Drawing Sheets

(56) References Cited

U.S. PATENT DOCUMENTS

| | | | |
|---|---|---|---|
| 2007/0008192 A1* | 1/2007 | Fujita | 341/50 |
| 2010/0045219 A1* | 2/2010 | Ajima et al. | 318/400.04 |
| 2012/0001063 A1* | 1/2012 | Horiguchi | 250/231.1 |
| 2012/0262731 A1* | 10/2012 | Nagura | 356/616 |
| 2012/0265484 A1* | 10/2012 | Nagura | 702/150 |
| 2013/0069634 A1* | 3/2013 | Acker | 324/166 |

FOREIGN PATENT DOCUMENTS

| | | |
|---|---|---|
| JP | 05026686 A | 2/1993 |
| JP | 2008-051507 A | 3/2008 |
| WO | 00/28283 A1 | 5/2000 |

\* cited by examiner

ENCODER AND APPARATUS WITH THE SAME

BACKGROUND OF THE INVENTION

1. Field of the Invention

The present invention relates to an encoder that is usable for various apparatuses such as optical apparatuses and outputs, with relative movement of a scale and a sensor, a signal showing position of a movable member provided in the apparatus.

2. Description of the Related Art

Encoders that are used to detect position and speed of a movable member are constituted by a scale and a sensor; the scale is provided with a periodic pattern and attached to, for example, a movable member, and the sensor is attached to a fixed member and reading the periodic pattern to output a signal corresponding to the position of the movable member. Such encoders perform an interpolation process by calculating a phase from plural phase periodic signals (two or three or more phase periodic signals) output from the sensor with relative movement of the scale and the sensor.

When taking in (reading) the plural phase periodic signals not simultaneously, but sequentially, reading times of the respective phase periodic signals have a difference. In a case where the scale and the sensor are relatively moved, relative positions of the scale and the sensor at the respective reading times are mutually different. In this case, the phases of the read phase periodic signals are mutually different, and therefore the interpolation process cannot provide a correct phase that should be obtained.

International publication No. WO2000/28283 discloses an encoder that performs an interpolation process after correcting a phase of one of two periodic signals read at mutually different relative positions of the scale and the sensor to a phase corresponding to the position at which the other thereof is read.

However, the encoder disclosed in International publication No. WO2000/28283 requires multiple trigonometric calculations for the correction, which increases load for signal processing and thereby may require a high-cost signal processor. Moreover, the encoder requires insertion of a process for the correction into a process for detecting the phase, which makes it difficult to use an existing signal processor without change.

SUMMARY OF THE INVENTION

The present invention provides an encoder enabling reduction of a number of times of trigonometric function calculations and making it easy to use an existing signal process.

The present invention provides as one aspect thereof an encoder including a scale provided with a periodic pattern, a sensor relatively movable with respect to the scale and configured to read the periodic pattern to output analog signals each having a changing period corresponding to the periodic pattern and having mutually different phases, an A/D converter configured to perform time-division analog-to-digital conversion on the analog signals output from the sensor to produce digital signals, and a phase detector configured to detect a phase from the digital signals. The encoder further includes a corrector configured to calculate a correction value by using a relative movement speed of the scale and the sensor and the detected phase detected by the phase detector, and configured to calculate a corrected phase from the correction value and the detected phase, and a position detector configured to calculate a position in a direction in which the scale and the sensor are relativity moved by using the corrected phase.

The present invention provides as another aspect thereof an apparatus including the above-described encoder, and a movable member whose position is detected by the encoder.

Further features of the present invention will become apparent from the following description of exemplary embodiments (with reference to the attached drawings).

DESCRIPTION OF THE PREFERRED EMBODIMENTS

Embodiments of the present invention will hereinafter be described with reference to the accompanying drawings.

[Embodiment 1]

Figure 1:
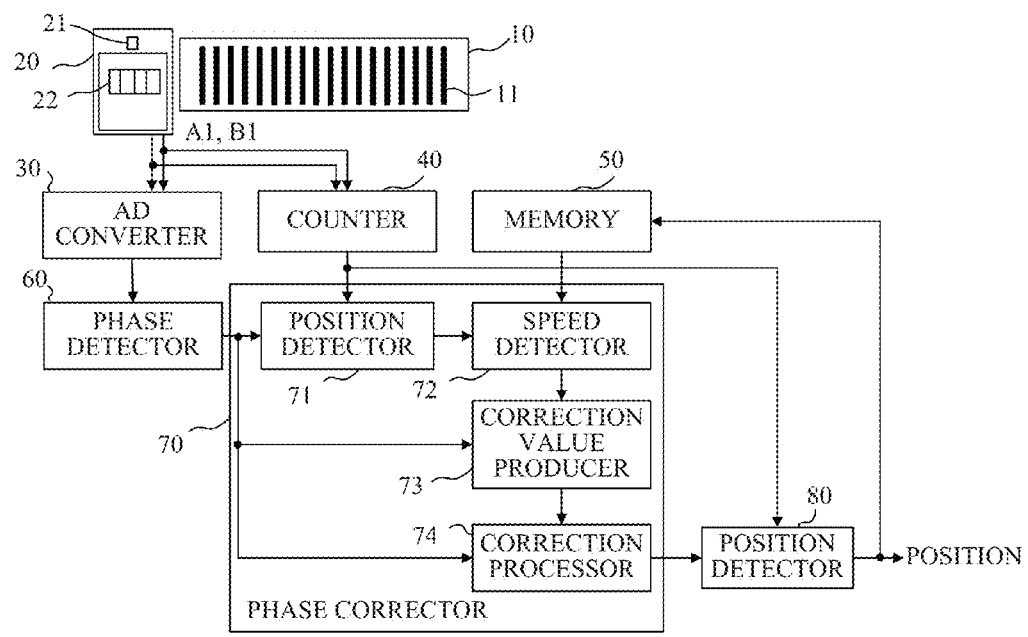
FIG. 1 is a block diagram showing a configuration of an encoder that is Embodiment 1 of the present invention.

FIG. 1 shows a configuration of an encoder that is a first embodiment (Embodiment 1) of the present invention. The encoder of this embodiment is constituted by a scale 10 that is provided with a periodic pattern and a sensor 20 as a detector that reads the periodic patterns. The scale 10 and the sensor 20 are relatively movable. The encoder further includes an A/D converter 30, a counter 40, a memory 50, a phase detector 60, a phase corrector 70 and a position detector 80.

The encoder of this embodiment is an optical reflective incremental encoder that detects a relative position of the scale 10 and the sensor 20. This embodiment describes a case where the scale 10 is attached to a movable member (not shown) of an apparatus equipped with this encoder and the sensor 20 is attached to a fixed (immovable) member thereof to detect a position of the movable member. This configuration also applies to other embodiments described later. However, another configuration may be employed in which the sensor 20 is attached to the movable member and the scale 10 is attached to the fixed member. Moreover, although this embodiment describes a case where the encoder is a linear encoder, a rotary encoder can be configured as well as this embodiment.

In addition, application of this embodiment described below makes it possible to configure an absolute encoder that detects an absolute position of one of the scale 10 and the sensor 20 as described in Embodiment 3. The relative position detected by the incremental encoder and the absolute position detected by the absolute encoder are both a position in a direction in which the scale 10 and the sensor 20 are relatively moved. The direction in which the scale 10 and the sensor 20 are relatively moved is hereinafter referred to as "a relative movement direction".

The scale 10 is provided with a periodic pattern 11 that includes reflective portions and non-reflective portions alternately arranged with a predetermined period (pitch). Each movement of the scale 10 (periodic pattern 11) by one period (one pitch) with respect to the sensor 20 causes the sensor 20 to output one period of two phase sine-wave signals A1 and B1 having a phase difference of 90 degrees. The two phase sine-wave signals are hereinafter simply referred to as "two phase signals". The two phase signals A1 and B1 are analog signals as sine-wave and cosine-wave signals whose phase are mutually different and each of which has a changing period corresponding to the periodic pattern 11.

The sensor 20 includes a light source 21 constituted by a light-emitting element such as an LED and a light receiver 22. The light receiver 22 receives detection light emitted from the light source 21 and reflected by the reflective portion of the periodic pattern 11, and photoelectrically converts the detection light. The light receiver 22 is constituted by a plurality of photoelectric conversion elements (light-receiving elements).

The two phase signals output from the sensor 20 are input to the A/D converter 30 and the counter 40. The A/D converter 30 converts the two phase signals to digital signals, and the digital signals are input to the phase detector 60. The A/D converter 30 performs time-division analog-to-digital conversion. That is, the two phase signals are not simultaneously converted into the digital signals, but alternately converted thereinto with a time difference. The phase detector calculates a phase (that is, a position) from the digital signals in one period of the periodic pattern 11.

On the other hand, the counter 40 is configured to count a number of periods (period number) of the input sine-wave signals and increase or decrease a counter value according to a relationship between the phases of the two phase signals (that is, according to the relative movement direction of the scale 10 and the sensor 20). The counter 40 enables detection of a relative movement amount from an arbitrary reference position in increments of one period of the periodic pattern 11. This embodiment describes a case where the reference position is set to a position corresponding to one end of the periodic pattern 11. Such a configuration makes it possible to calculate the position of the scale 10 (that is, of the movable member) by using the position in one period of the periodic pattern 11 and the counter value.

Since the two phase signals (digital signals) are sine-wave and cosine-wave signals as described above, the phase detector 60 performs arctan calculation thereon to calculate a phase (hereinafter referred to as "a detected phase") θ.

As described above, the A/D converter 30 performs the time-division analog-to-digital conversion. Since the sensor 20 outputs the two phase signals depending on a relative positional relationship between the sensor 20 and the scale 10, the sensor 20 outputs same two phase signals as long as they have a same relative positional relationship even though times at which the analog-to-digital conversion is performed are different. Therefore, since the two phase signals do not change when the scale 10 and the sensor 20 are relatively unmoved, the detection phase θ does not involve an error even though the times at which the analog-to-digital conversion is performed are different.

However, when the scale 10 and the sensor 20 are relatively moved, the relative positional relationship between the scale 10 and the sensor 20 is also changed at different times. As a result, the two phase signals are respectively subjected to the analog-to-digital conversion at different positions, which causes an error of the detected phase θ obtained by the arctan calculation.

In this embodiment, the A/D converter 30 converts the two phase signals A1 and B1 that are respectively a cosine-wave signal and a sine-wave signal into digital signals in order of A1→B1. Therefore, the digital signals a and b respectively converted from the two phase signals A1 and B1 are expressed by the following expressions (1) and (2) where θ represents a phase of the two phase signals at a time at which the cosine-wave signal A1 is converted into the digital signal a, P represents the period of the reflective portions of the periodic pattern 11, V represents a relative movement speed of the scale 10 and the sensor 20, and ΔT represents a difference (time difference) between the times at which the analog-to-digital conversion is performed on the two phase signals A1 and B1. The period P of the reflective portions of the periodic pattern 11 is hereinafter simply referred to as "a pitch P of the periodic pattern 11", the time at which the analog-to-digital conversion is performed is hereinafter referred to as "an A/D conversion time", and the time difference between the times at which the analog-to-digital conversion is performed is hereinafter referred to as "an A/D conversion time difference". Furthermore, the detected phase θ is expressed by the following expression (3) where MOD(x,y) represents a remainder when x is a dividend and y is a divisor.

$$a = \cos\Theta \quad (1)$$

$$b = \sin\left(\Theta + \frac{2\pi V \Delta T}{P}\right) \quad (2)$$

$$\theta = \begin{cases} MOD\left(\tan^{-1}\left(\frac{b}{a}\right), 2\pi\right) & (a > 0) \\ \tan^{-1}\left(\frac{b}{a}\right) + \pi & (a < 0) \\ \frac{\pi}{2} & (a = 0, b > 0), 0 \le \theta < 2\pi \\ \frac{3\pi}{2} & (a = 0, b < 0) \\ \text{indeterminate} & (a = 0, b = 0) \end{cases} \quad (3)$$

Next, a position detector (hereinafter referred to as "a first position detector") 71 calculates a relative position x of the scale 10 and the sensor 20 by using the detected phase θ calculated by the phase detector 60 and the counter value m obtained from the counter 40. The relative position x is calculated by the following expression (4) using the pitch P of the periodic pattern 11, the detected phase θ and the counter value m.

$$x = \left(m + \frac{\theta}{2\pi}\right)P \quad (4)$$

Except at a first (initial) position detection, a memory 50 stores a position $x_0$ at a certain previous time $t_0$. A speed detector 72 calculates (detects) a relative movement speed u of the scale 10 and the sensor 20 by the following expression (5) using the A/D conversion time t of the cosine-wave signal A1 and the position x. The relative movement speed u at the first position detection is 0.

$$u = P \cdot \frac{x - x_0}{2\pi} \cdot \frac{1}{t - t_0} \quad (5)$$

The calculated (detected) relative movement speed (hereinafter referred to as "a detected speed") u is an average speed from the time t0 to the A/D conversion time t of the cosine-wave signal A1, so that speed-up or speed-down of the movable member brings the detected speed u into a different speed from the actual relative movement speed V, which means that the detected speed u involves an error. However, calculating the detected speed u at a time interval sufficiently short with respect to acceleration of the movable member enables reduction of the error.

Moreover, as is a case with general encoders, the encoder of this embodiment is used in a condition where a period of time needed for the A/D conversion by the A/D converter 30 is sufficiently shorter than a change speed of the phase of the two phase signals output from the sensor 20. The A/D conversion time difference ΔT is almost same as the period of time needed for the A/D conversion by the A/D converter 30, and the change speed of the phase is proportional to the relative movement speed V of the scale 10 and the sensor 20. In addition, the pitch P of the periodic pattern 11 is a constant in design. Therefore, VΔT/P is sufficiently small, and the error E involved in the detected phase θ is approximated by the following expression (6) and shown in a graph of FIG. 2.

$$E = \theta - \Theta \approx \frac{\pi V \Delta T}{P}(\cos 2\theta - 1) \quad (6)$$

Thus, a correction value producer 73 produces, by using the detected speed u obtained by the speed detector 72, a correction value s expressed by the following expression (7). As understood from a comparison of the expressions (6) and (7), the correction value s is an approximate value to the error E.

$$s = \frac{\pi u \Delta T}{P}(\cos 2\theta - 1) \quad (7)$$

Then, a correction processor 74 calculates a corrected phase $\theta_c$ from the detection phase θ and the correction value s. The corrected phase $\theta_c$ is expressed by the following expression (8). The correction value s is proportional to the detected speed u, so that an initial correction value at the first position detection where the detected speed u is 0 is 0 (s=0), which is synonymous with not performing the correction.

$$\theta_c = MOD(\theta - s, 2\pi) \quad (8)$$

Thus, the corrected phase $\theta_c$ involving a smaller error than that involved in the detected phase θ calculated by the phase detector 60 is calculated. Then, a position detector (hereinafter referred to as "a second position detector") 80 calculates, as well as the first position detector 71, a relative position $x_c$ of the scale 10 and the sensor 20 from the corrected phase $\theta_c$ and the counter value m of the counter 40 by using the following expression (9).

$$x_c = \left(m + \frac{\theta_c}{2\pi}\right)P \quad (9)$$

Finally, the second position detector 80 outputs the calculated position $x_c$ and the memory 50 stores the position $x_c$ and the A/D conversion time t of the cosine-wave signal A1.

As described above, this embodiment enables decrease of a number of times of trigonometric function calculations, which makes it possible to reduce load for signal processing. Moreover, this embodiment performs a process for detecting the phase and thereafter corrects the detected phase, which enables highly accurate position detection with a simple configuration in which only a function of correcting the phase is added to an existing signal processor.

Although the position $x_c$ calculated by the expression (9) has a higher accuracy than that of the position x calculated by the expression (4), since the detected speed u is calculated by using the position x in the expression (5), an influence of the detection error of the detected speed u remains in the position $x_c$. Thus, when calculation of a more highly accurate position is desired, a process may be employed which calculates a more highly accurate detected speed by using the position $x_c$ and calculates a position based thereon.

When calculating $u_i$, $s_i$, $\theta_i$ and $x_i$ by the following expressions (10) where i represents a number of repletion times of a series of calculations of these expressions, errors involved in the detected speed u, the correction value s, the detected phase θ and the position x are reduced as i increases. In the following expressions, $u_1$=u, $s_1$=s, $\theta_0$=θ, $\theta_1$=$\theta_c$, $x_1$=x, and $x_2$=$x_c$.

$$\begin{cases} u_i = P \cdot \frac{x_i - x_0}{2\pi} \cdot \frac{1}{t - t_0} \\ s_i = \frac{\pi u_i \Delta T}{P}(\cos 2\theta_{i-1} - 1) \\ \theta_i = MOD(\theta - s_i, 2\pi) \\ x_{i+1} = \left(m + \frac{\theta_i}{2\pi}\right)P \\ x_1 = x, \theta_0 = \theta \end{cases} \quad (10)$$

Although this embodiment calculates the detected speed u from the two detected phases, the detected speed u may be calculated from three or more detected phases. This case can use, not a linear approximation, but a higher-order approximation. Increasing a number of the detected phases to be used for calculating the detected speed increases accuracy of the detected speed.

Moreover, although this embodiment described the configuration of calculating the detected speed from the detected phases inside the encoder, another configuration may be used which obtains information on speed corresponding to the relative movement speed of the scale 10 and the sensor 20 from a system of an apparatus equipped with the encoder and uses the obtained speed as the detected speed u. This configuration eliminates a need for the memory 50, the first position detector 71 and the speed detector 72.

Moreover, calculating the detected speed from two or more detected phases and corresponding times at which the errors E shown by the expression (6) (that is, the corrected values s shown by the expression (7)) are equal to one another reduces the errors E involved in the positions x and $x_0$ since calculation of x−$x_0$ cancels out the errors E. This calculation makes it possible to provide the detected speed u involving a smaller error, which enables further improvement of position detection accuracy after the phase correction.

Moreover, when two (or more) phases detected at different times in specific cases such as a case where the relative movement speed V is constant provide values of ΔT(cos 2θ−1) that are equal to one another (or that can be regarded as being sufficiently close to one another), it is desirable to calculate the detected speed u by using these phases. This calculation can sufficiently reduce the error involved in the detected speed u, which enables further improvement of position detection accuracy after the phase correction. When using an A/D converter whose A/D conversion time difference ΔT is a fixed value, just using two (or more) phases providing values of cos 2θ that are equal to one another (or that can be regarded as being sufficiently close to one another) enables reduction of the error involved in the detected speed u.

Figure 2:
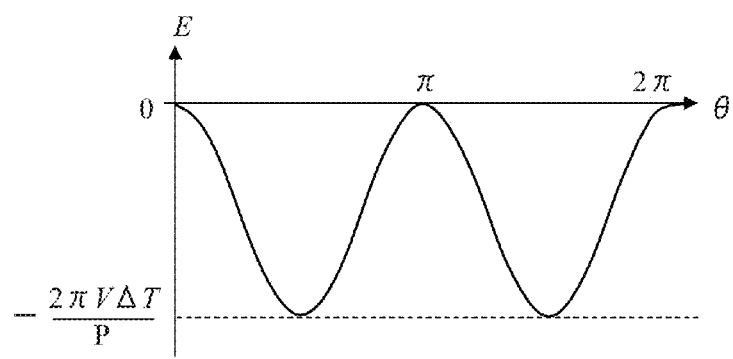
FIG. 2 shows a relationship between phases and errors in the encoder of Embodiment 1

Moreover, as understood from the expression (7) and FIG. 2, when the detected phase θ is nearly equal to 0 or π (θ≈0 or π), the error E becomes nearly equal to 0 (E≈0). Therefore, calculating the detected speed u from times at which the detected phase θ is nearly equal to 0 and π further reduces the error E involved in the detected speed u. Furthermore, performing the position detection when the detected phase θ is nearly equal to 0 and π reduces a phase error component regardless of speed condition, which enables improvement of position detection accuracy.

In addition, this embodiment described the case where the memory 50 stores the position x, and the A/D conversion time t. However, since a constant interval of the A/D conversion times t enables calculation of the speed as a designed value, the memory 50 may store only the position $x_c$.

[Embodiment 2]

Figure 3:
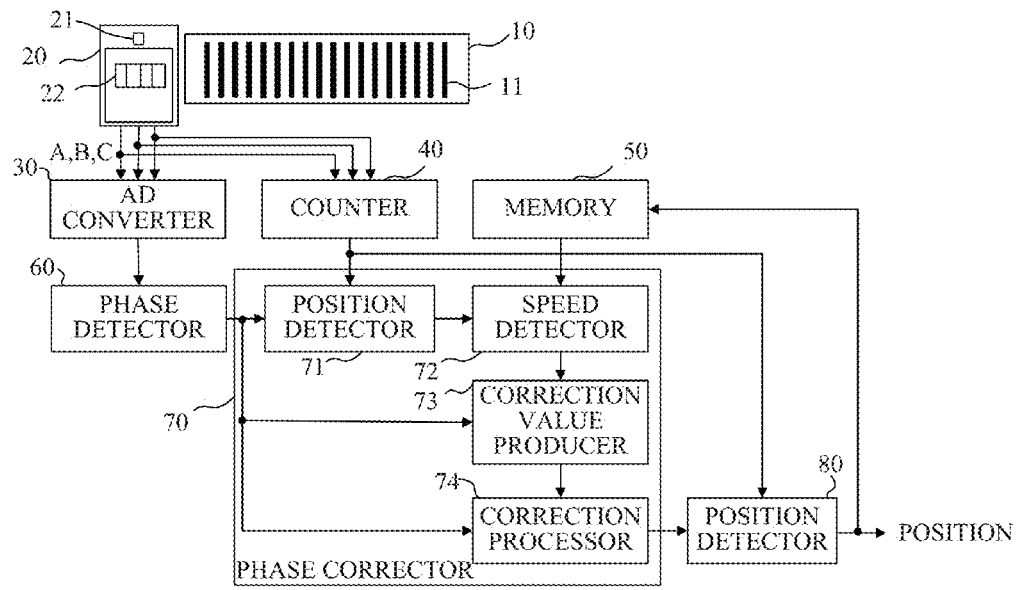
FIG. 3 is a block diagram showing a configuration of an encoder that is Embodiment 2 of the present invention.

Next, description will be made of an encoder that is a second embodiment (Embodiment 2) of the present invention. The following description is made of differences from Embodiment 1. FIG. 3 shows the encoder of this embodiment. This embodiment is different from Embodiment 1 in that a sensor outputs three phase sine-wave signals (hereinafter referred to as "three phase signals) A, B and C mutually having a phase difference of 120 degrees.

The three phase signals A, B and C are subjected to time-division analog-to-digital conversion by an A/D converter 30 to be converted into digital signals a, b and c. The digital signals a, b and c are expressed by the following expressions (11), (12) and (13) where Θ represents a phase of the three phase signals at a time at which the sine-wave signal B is converted into the digital signal b, P represents a period of a periodic pattern 11 provided in a scale 10, V represents a relative movement speed of the scale 10 and the sensor 20, and ΔT represents a A/D conversion time difference. The A/D conversion into the digital signals a, b and c are performed with a same A/D conversion time difference ΔT.

$$a = \sin\left(\Theta - \frac{2\pi}{3} - \frac{2\pi V\Delta T}{P}\right) \quad (11)$$

$$b = \sin\Theta \quad (12)$$

$$c = \sin\left(\Theta + \frac{2\pi}{3} + \frac{2\pi V\Delta T}{P}\right) \quad (13)$$

As shown by the following expression (14), a difference between the digital signals a and c provides a signal having a phase difference of 90 degrees from the digital signal b.

$$c - a = 2\sin\left(\frac{2\pi V\Delta T}{P} + \frac{\pi}{3}\right)\cos\Theta \quad (14)$$

Thus, this embodiment calculates, as well as Embodiment 1, a detected phase θ by arctan calculation as shown by the following expression (15). An error E involved in the detected phase θ is approximated by the following expression (16) when VΔT/P is sufficiently small.

$$\theta = \begin{cases} MOD\left(\tan^{-1}\left(\sqrt{3} \cdot \frac{b}{c-a}\right), 2\pi\right) & (c-a>0) \\ \tan^{-1}\left(\sqrt{3} \cdot \frac{b}{c-a}\right) + \pi & (c-a<0) \\ \frac{\pi}{2} & (c-a=0, b>0), 0 \leq \theta < 2\pi \\ \frac{3\pi}{2} & (c-a=0, b<0) \\ \text{indeterminate} & (c-a=0, b=0) \end{cases} \quad (15)$$

$$E = \theta - \Theta \approx \frac{\sqrt{3}\,V\Delta T}{6P} \cdot \sin 2\theta \quad (16)$$

The error E is a function of V, ΔT, P and θ, so that producing a correction value s shown by the following expression (17) and then correcting the detected phase θ enables calculation of a corrected phase, as well as in Embodiment 1.

$$s = \frac{\sqrt{3}\,u\Delta T}{6P} \cdot \sin 2\theta \quad (17)$$

Moreover, as well as in Embodiment 1, when the detected phase θ is nearly equal to 0 or π (θ≈0 or π), the error E becomes nearly equal to 0 (E≈0). Therefore, calculating the detected speed u from times at which the detected phase θ is nearly equal to 0 and π further reduces the error E involved in the detected speed u. Furthermore, when the detected phase θ is not nearly equal to (also not equal to) 0 and π, calculating the detected speed u from phases and times at which the errors E become approximately equal to one another can provide a similar effect.

[Embodiment 3]

Figure 4:
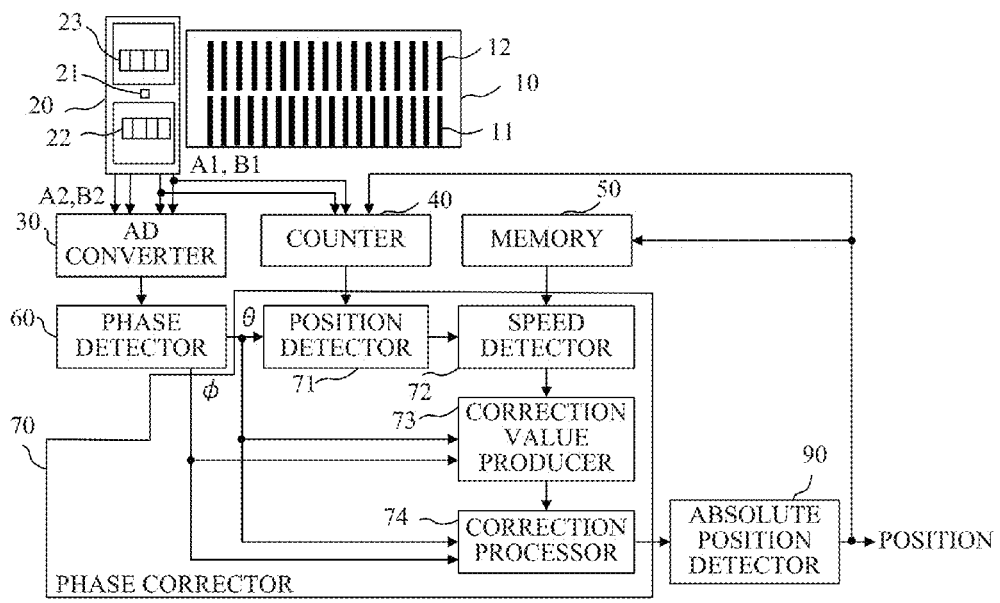
FIG. 4 is a block diagram showing a configuration of an encoder that is Embodiment 3 of the present invention.

Next, description will be made of an encoder that is a third embodiment (Embodiment 3) of the present invention. The following description is made of differences from Embodiment 1. FIG. 4 shows the encoder of this embodiment. This embodiment is different from Embodiment 1 in that a scale 10 is provided with two periodic patterns 11 and 12 and a sensor 20 is provided with two light receivers 22 and 23. Moreover, the encoder of this embodiment is an absolute encoder that detects an absolute position of the scale 10 (that is, the above-described position of the scale 10 in the relative movement direction of the scale 10 and the sensor 20) by using two pairs of two periodic signals corresponding to the two periodic patterns 11 and 12.

The periodic patterns 11 and 12 have mutually different pitches P1 and P2, and are relatively moved together with the scale 10 with respect to the sensor 20. The light receivers 22 and 23 of the sensor 20 respectively photoelectrically convert detection lights emitted from a same light source 21 and reflected by reflective portions of the periodic patterns 11 and 12. Each of the light receivers 22 and 23 outputs, according to relative movement of the scale 10 and the sensor 20, two phase signals mutually having a phase difference of 90 degrees. Thus, the above-mentioned two pairs of the two phase signals are output from the two light receivers 22 and 23. The periodic patterns 11 and 12 have same total lengths in a relative movement direction of the scale 10 and the sensor 20, and respectively include N reflective portions and N−1 reflective portions. Therefore, a difference (phase difference) between a phase of the pair of the two phase signals output from the light receiver 22 corresponding to the periodic pattern 11 and a phase of the pair of the two phase signals output from the light receiver 23 corresponding to the periodic pattern 12 shows the absolute position of the scale 10 (or a movable member to which the scale 10 is attached).

An A/D converter 30 converts the two pairs of the two phase signals (four analog periodic signals in all) into digital signals in order of a cosine-wave signal A1 from the light receiver 22, a sine-wave signal B1 from the light receiver 22, a cosine-wave signal A2 from the light receiver 23 and a sine-wave signal B2 from the light receiver 23. The digital signals $a_1$, $b_1$, $a_2$ and $b_2$ respectively obtained by the A/D conversion of the periodic signals A1, B1, A2 and B2 are expressed by the following expression (18), (19), (20) and (21) where $\Theta$ and $\Phi$ respectively represent phases of the two pairs of the two phase signals corresponding to the periodic patterns 11 and 12 at a time at which the cosine-wave signal A1 is converted into the digital signal $a_1$, P1 and P2 represents the pitches of the periodic patterns 11 and 12, V represents a relative movement speed of the scale 10 and the sensor 20, and $\Delta T$ represents a A/D conversion time difference. The A/D conversion into the digital signals $a_1$, $b_1$, $a_2$ and $b_2$ are performed with a same A/D conversion time difference $\Delta T$.

$$a_1 = \cos\Theta \tag{18}$$

$$b_1 = \sin\left(\Theta + \frac{2\pi V \Delta T}{P_1}\right) \tag{19}$$

$$a_2 = \cos\left(\Phi + \frac{2\pi V \cdot 2\Delta T}{P_2}\right) \tag{20}$$

$$b_2 = \sin\left(\Phi + \frac{2\pi V \cdot 3\Delta T}{P_2}\right) \tag{21}$$

As well as in Embodiment 1, a phase detector 60 calculates the phase of the digital signals $a_1$ and $b_1$ as a detected phase $\theta$, a position detector 71 calculates a position x from the detected phase $\theta$, and then a speed detector 72 calculates a detected speed u. However, the encoder of this embodiment is an absolute encoder as described above, and thus an initial counter value is indeterminate and position detection is not performed by the position detector 71. In this embodiment, a first (initial) detected speed u is 0 as in Embodiment 1.

A correction value producer 73 and a correction processor 74 subsequently perform same processes as those in Embodiment 1 to calculate a corrected phase $\theta_c$. On the other hand, the phase detector 60 calculates a detected phase $\phi$ of the digital signals $a_2$ and $b_2$ by arctan calculation shown by the following expression (22).

$$\phi = \begin{cases} MOD\left(\tan^{-1}\left(\frac{b_2}{a_2}\right), 2\pi\right) & (a_2 > 0) \\ \tan^{-1}\left(\frac{b_2}{a_2}\right) + \pi & (a_2 < 0) \\ \frac{\pi}{2} & (a_2 = 0, b_2 > 0), 0 \le \phi < 2\pi \\ \frac{3\pi}{2} & (a_2 = 0, b_2 < 0) \\ \text{indeterminate} & (a_2 = 0, b_2 = 0) \end{cases} \tag{22}$$

Then, the correction value producer 73 produces a correction value for the detected phase $\phi$ by using the detected speed u calculated from the detected phase $\theta$. The A/D conversion time t of the two phase signals corresponding to the periodic pattern 11 and the A/D conversion time of the two phase signals corresponding to the periodic pattern 12 have a difference of $2\Delta T$.

Therefore, a change amount of the phase corresponding to the time difference $2\Delta T$ is added to the correction value for correcting the detected phase $\phi$. The correction value $s_2$ for the detected phase $\phi$ is expressed by the following expression (23). The correction processor 74 corrects the detected phase $\phi$ as shown in the following expression (24) to provide a corrected phase $\phi_c$.

$$s_2 = \frac{\pi u \Delta T}{P_2}(\cos 2\phi - 1) + \frac{2\pi u \cdot 2\Delta T}{P_2} \tag{23}$$

$$\phi_c = MOD(\phi - s_2, 2\pi) \tag{24}$$

Furthermore, an absolute position detector 90 calculates the absolute position from the corrected phases $\theta_c$ and $\phi_c$ thus calculated. As described above, the number of the reflective portions of the respective periodic patterns 11 and 12 are N and N−1, and thereby a phase difference between the corrected phases $\theta_c$ and $\phi_c$ shows a position. The phase difference y is calculated by the following expression (25).

$$y = MOD(\theta_c - \phi_c, 2\pi) \tag{25}$$

The phase difference y is influenced by errors involved in the corrected phases $\theta_c$ and $\phi_c$, so that, within a range of one reflective portion, the corrected phase $\theta_c$ is more accurate than the phase difference y. Thus, the absolute position detector 90 calculates a position x with accuracy corresponding to the corrected phase $\theta_c$. The phase difference y is expressed by a value from 0 to $2\pi$ corresponding to the total length of the periodic pattern 11, and therefore the following expression (26) enables calculation of m corresponding to a counter value of an incremental encoder. Accordingly, as well as in Embodiment 1, the position x can be calculated by the following expression (27) where ROUND(x) represents rounding of x to a nearest integer.

$$m = \text{ROUND}\left(\frac{yN - \theta_c}{2\pi}\right) \tag{26}$$

$$x = \left(m + \frac{\theta}{2\pi}\right)P_1 \tag{27}$$

Then, the absolute position detector 90 sets the value of m to a counter 40 after the absolute position detection, and a memory 50 stores the position x and the A/D conversion time t of the cosine-wave signal A1.

Although this embodiment described the calculation of the detected speed u by using a change amount of the position, another calculation may be employed which stores a previous phase to a memory and obtains a change amount of the phase from the previous phase and a current phase to calculate the detected speed u. This calculation process eliminates a need for the counter 40 and the position detector 71.

Moreover, although this embodiment described the case of calculating the detected speed u from only the periodic pattern 11, the detected speed u may be calculated from both the periodic patterns 11 and 12. This case enables calculation of a more accurate speed by averaging two detected speeds, and makes it possible to detect a speed detection error when a difference between the two detected speeds exceeds an upper limit (threshold).

Furthermore, although this embodiment described the case of calculating the absolute position from the two pairs of the two phase signals, the absolute position may be calculated from three or more phase signals. This case increases reliability of the absolute encoder, enlarges an allowable range of alignment of the scale and the sensor, and increases a position detectable range of the encoder.

Moreover, although this embodiment described the case of attaching the scale provided with the periodic patterns to a movable member (or a fixed member), the periodic pattern may be formed directly in the movable member, without using the scale as a member separate from the movable member. In this case, the movable member itself corresponds to the scale.

In addition, the above embodiments described the optical encoder that uses the reflected light from the periodic pattern including the reflective and non-reflective portions alternately arranged. However, an alternative embodiment of the present invention includes an optical encoder that uses transmitted light from a periodic pattern including transmissive and non-transmissive portions alternately arranged. Moreover, another alternative embodiment of the present invention includes a magnetic encoder constituted by a magnetic scale and a magnetic sensor.

[Embodiment 4]

Figure 5:
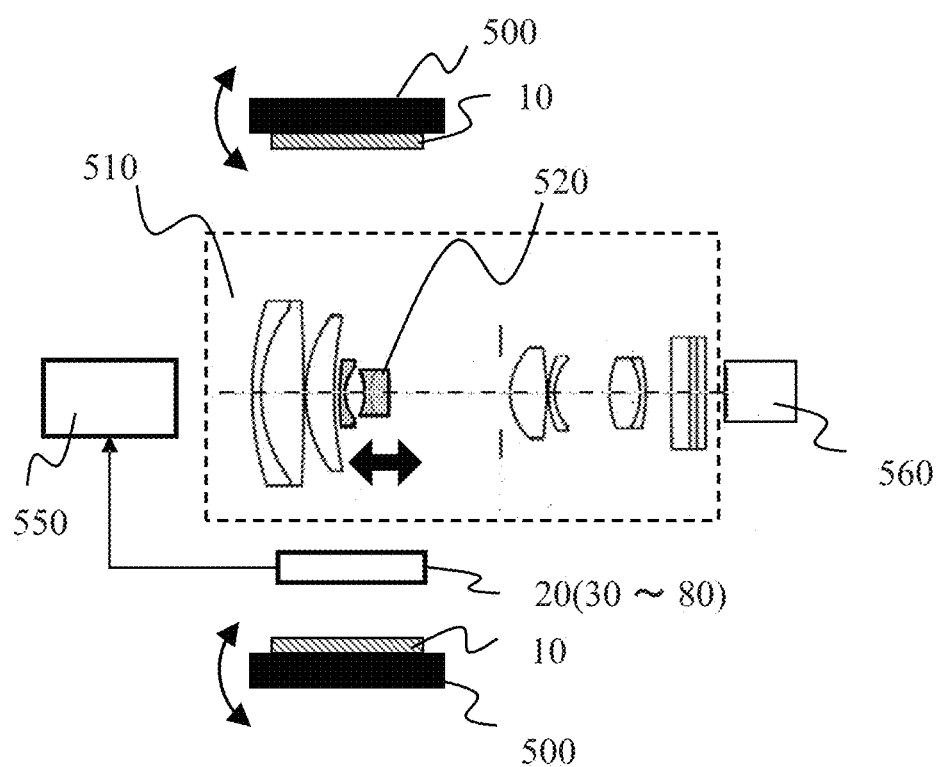
FIG. 5 shows a configuration of an image pickup apparatus that is Embodiment 4 of the present invention.

FIG. 5 shows a configuration of an image pickup apparatus (or an optical apparatus) such as a digital still camera or a video camera, as an example of the apparatus equipped with the encoder described in Embodiment 1. This image pickup apparatus uses the encoder for detecting a position of a movable lens in a lens barrel. The encoders of Embodiments 2 and 3 can be used in the image pickup apparatus instead of the encoder of Embodiment 1.

In FIG. 5, reference numerals 10 and 20 respectively denotes the scale and sensor described in Embodiment 1. The A/D converter 30, the counter 40, the memory 50, the phase detector 60, the phase corrector 70 and the second position detector 80 are illustrated integrally with the sensor 20. The scale 10 is attached to an inner circumferential surface of a cam ring 500 having a cylindrical shape and being rotatable about an optical axis in the lens barrel.

The cam ring 500 is rotatably driven by an actuator (not shown).

The lens barrel houses an image capturing optical system 510. The image capturing optical system 510 includes a movable lens 520 (such as a magnification-varying lens or a focus lens). The movable lens 520 is moved in a direction of the optical axis by a cam formed in the cam ring 500 when the cam ring 500 is rotated.

Reference numeral 550 denotes a CPU that controls an entire system of the image pickup apparatus. Reference numeral 560 denotes an image sensor that photoelectrically converts an object image formed by the image capturing optical system 510. The image sensor 560 is constituted by a CCD sensor or a CMOS sensor.

When the cam ring 500 is rotated for moving the movable lens 520, a rotational position of the cam ring 500, that is, the position of the movable lens 520 in the optical axis direction is detected by the encoder, and information on the detected position is output to the CPU 550.

The CPU 550 drives the actuator based on the information on the position to rotate the cam ring 500 so as to move the movable lens 520 to a target position.

The encoder described in each of the above embodiments can be used not only for the image pickup apparatus, but also for various optical apparatuses such as a printer performing position detection of a print head or a sheet-supplying roller, a copier performing position detection of a photoconductive drum, and a robot performing position detection of a robot arm.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-226417, filed on Oct. 14, 2011, which is hereby incorporated by reference herein in its entirety.

What is claimed is:

1. An encoder comprising:
a scale provided with a periodic pattern;
a sensor relatively movable with respect to the scale and configured to read the periodic pattern to output analog signals each having a changing period corresponding to the periodic pattern and having mutually different phases;
an A/D converter configured to perform time-division analog-to-digital conversion on the analog signals output from the sensor to produce digital signals;
a phase detector configured to detect a phase from the digital signals;
a corrector configured to calculate:
a correction value using:
(a) a relative movement speed of the scale and the sensor,
(b) a difference between times at which the analog signals output from the sensor are subjected to the time-division analog-to-digital conversion, and
(c) the phase detected by the phase detector; and
a corrected phase from the correction value and the detected phase; and
a position detector configured to calculate a position in a direction in which the scale and the sensor are relativity moved using the corrected phase.

2. An encoder according to claim 1, wherein the corrector is configured to produce an initial value of the correction value by setting the relative movement speed to 0.

3. An encoder according to claim 1, further comprising a speed detector configured to calculate the relative movement speed using the phases detected by the phase detector at mutually different times.

4. An encoder according to claim 3, wherein the speed detector is configured to calculate the relative movement speed using the detected phases at which the correction values are equal to one another.

5. An encoder according to claim 4, wherein the speed detector is configured to calculate the relative movement speed using the detected phases $\theta$ at which values of $\Delta T(\cos 2\theta - 1)$ are equal to one another, where $\Delta T$ represents the difference between the times at which the analog signals output from the sensor are subjected to the time-division analog-to-digital conversion.

6. An encoder according to claim 1, wherein the corrector is configured to calculate the correction value s with the following expression:

$$s = (\pi u \Delta T/P) \cdot (\cos 2\theta - 1),$$

where P represents a period of the analog signals output from the sensor, $\Delta T$ represents the difference between the times at which the analog signals are subjected to the time-division analog-to-digital conversion, $\theta$ represents the detected phase detected by the phase detector, and u represents the relative movement speed.

7. An apparatus comprising:
an encoder; and
a movable member whose position is detected by the encoder,
wherein the encoder comprises:
a scale provided with a periodic pattern;
a sensor relatively movable with respect to the scale and configured to read the periodic pattern to output analog signals each having a changing period corresponding to the periodic pattern and having mutually different phases;
an A/D converter configured to perform time-division analog-to-digital conversion on the analog signals output from the sensor to produce digital signals;
a phase detector configured to detect a phase from the digital signals;
a corrector configured to calculate:
  a correction value using:
    (a) a relative movement speed of the scale and the sensor,
    (b) a difference between times at which the analog signals output from the sensor are subjected to the time-division analog-to-digital conversion, and
    (c) the phase detected by the phase detector; and
  a corrected phase from the correction value and the detected phase; and
a position detector configured to calculate a position in a direction in which the scale and the sensor are relativity moved using the corrected phase.

* * * * *